(12) United States Patent
Sykula et al.

(10) Patent No.: US 11,643,052 B2
(45) Date of Patent: May 9, 2023

(54) CLEANING APPARATUS FOR SENSOR

(71) Applicants: Ford Global Technologies, LLC, Dearborn, MI (US); Valeo North America, Inc., Auburn Hills, MI (US)

(72) Inventors: Andre Sykula, Sterling Heights, MI (US); Kunal Singh, Farmington Hills, MI (US); Venkatesh Krishnan, Canton, MI (US); Raghuraman Surineedi, Dearborn, MI (US); Yoann Dolle, Auburn Hills, MI (US); William Terrasse, Issoire (FR); Denis Thebault, Auburn Hills, MI (US); Veeramanikandan Gopal, Auburn Hills, MI (US); Gowtham Ilanthirayan, Auburn Hills, MI (US); Michael Whitney, Auburn Hills, MI (US)

(73) Assignees: Ford Global Technologies, LLC, Dearborn, MI (US); Valeo North America, Inc., Auburn Hills, MI (US)

(*) Notice: Subject to any disclaimer, the term of this patent is extended or adjusted under 35 U.S.C. 154(b) by 239 days.

(21) Appl. No.: 17/036,978

(22) Filed: Sep. 29, 2020

(65) Prior Publication Data
US 2022/0097656 A1 Mar. 31, 2022

(51) Int. Cl.
*B60S 1/56* (2006.01)
*B60S 1/54* (2006.01)
(Continued)

(52) U.S. Cl.
CPC .................. *B60S 1/56* (2013.01); *B05B 1/04* (2013.01); *B05B 1/14* (2013.01); *B05B 1/202* (2013.01); *B05B 1/262* (2013.01); *B60J 1/2002* (2013.01); *B60S 1/52* (2013.01); *B60S 1/54* (2013.01); *G02B 27/0006* (2013.01)

(58) Field of Classification Search
None
See application file for complete search history.

(56) References Cited

U.S. PATENT DOCUMENTS 7,258,286 B1 * 8/2007 Wang .................... B05B 1/3013
239/443
10,259,431 B1 * 4/2019 Ybarra ...................... B08B 3/02
(Continued)

FOREIGN PATENT DOCUMENTS

DE 102012004815 A1 * 9/2013 ............. B05B 3/066
DE 102015015910 B3 * 6/2017
(Continued)

*Primary Examiner* — Spencer E. Bell
*Assistant Examiner* — Omar Chaudhri
(74) *Attorney, Agent, or Firm* — Frank A. MacKenzie; Bejin Bieneman PLC

(57) ABSTRACT

A sensor-cleaning apparatus includes an upper piece, a lower piece fixed to the upper piece, a plurality of inserts inserted into the upper piece, and a plurality of nozzles. The upper piece and the lower piece form a tubular segment that is elongated along an arc of a circle and encloses a chamber. Each nozzle is formed of the upper piece and one of the inserts. Each nozzle includes a deflection surface and a tunnel from the chamber to the deflection surface, and each tunnel is partially formed of the upper piece and partially formed of the respective insert.

19 Claims, 7 Drawing Sheets

(51) Int. Cl.
*G02B 27/00* (2006.01)
*B05B 1/14* (2006.01)
*B60S 1/52* (2006.01)
*B05B 1/26* (2006.01)
*B05B 1/20* (2006.01)
*B05B 1/04* (2006.01)
*B60J 1/20* (2006.01)

(56) References Cited

U.S. PATENT DOCUMENTS

| | | | |
|---|---|---|---|
| 10,328,906 B2 | 6/2019 | Hester et al. | |
| 2007/0235568 A1* | 10/2007 | Wang | B05B 3/044 |
| | | | 239/443 |
| 2008/0054103 A1* | 3/2008 | Nies | B05B 3/044 |
| | | | 239/562 |
| 2011/0284663 A1* | 11/2011 | Natterer | B05B 1/26 |
| | | | 239/587.5 |
| 2016/0030954 A1* | 2/2016 | Gopalan | B60S 1/52 |
| | | | 239/466 |
| 2017/0036650 A1* | 2/2017 | Hester | B60S 1/52 |
| 2017/0136472 A1* | 5/2017 | Gopalan | B05B 17/04 |
| 2018/0015907 A1* | 1/2018 | Rice | B60S 1/56 |
| 2018/0029566 A1* | 2/2018 | Gopalan | B60S 1/52 |
| 2018/0134258 A1* | 5/2018 | Ekola | B60S 1/52 |
| 2018/0201232 A1* | 7/2018 | Ringler | B08B 3/02 |
| 2019/0061702 A1* | 2/2019 | Gopalan | B60S 1/52 |
| 2019/0202410 A1* | 7/2019 | Zhao | B60S 1/56 |
| 2019/0232315 A1 | 8/2019 | Mousavi Ehteshami et al. | |
| 2019/0314865 A1 | 10/2019 | Sevak et al. | |
| 2020/0023815 A1* | 1/2020 | Galera | B60S 1/56 |
| 2020/0030822 A1* | 1/2020 | Levake | B05B 1/00 |
| 2020/0159010 A1* | 5/2020 | Kuwae | G01S 7/4813 |
| 2021/0061237 A1* | 3/2021 | Krishnan | G01S 17/42 |
| 2021/0309187 A1* | 10/2021 | Rice | B60S 1/56 |
| 2021/0339710 A1* | 11/2021 | Adams | B08B 3/02 |
| 2022/0009453 A1* | 1/2022 | Rachow | B05B 15/65 |
| 2022/0041139 A1* | 2/2022 | Surineedi | G01S 7/4813 |
| 2022/0048476 A1* | 2/2022 | Weitzel | F24H 1/103 |
| 2022/0057509 A1* | 2/2022 | Sykula | G01S 17/931 |
| 2022/0066032 A1* | 3/2022 | Glickman | G02B 27/0006 |

FOREIGN PATENT DOCUMENTS

| | | | |
|---|---|---|---|
| JP | h-09315270 A | * 12/1997 | B60S 1/52 |
| JP | h-10202149 A | * 8/1998 | B60S 1/52 |
| KR | 100571667 B1 | * 4/2006 | |

* cited by examiner

CLEANING APPARATUS FOR SENSOR

BACKGROUND

Vehicles can include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

Figure 1:
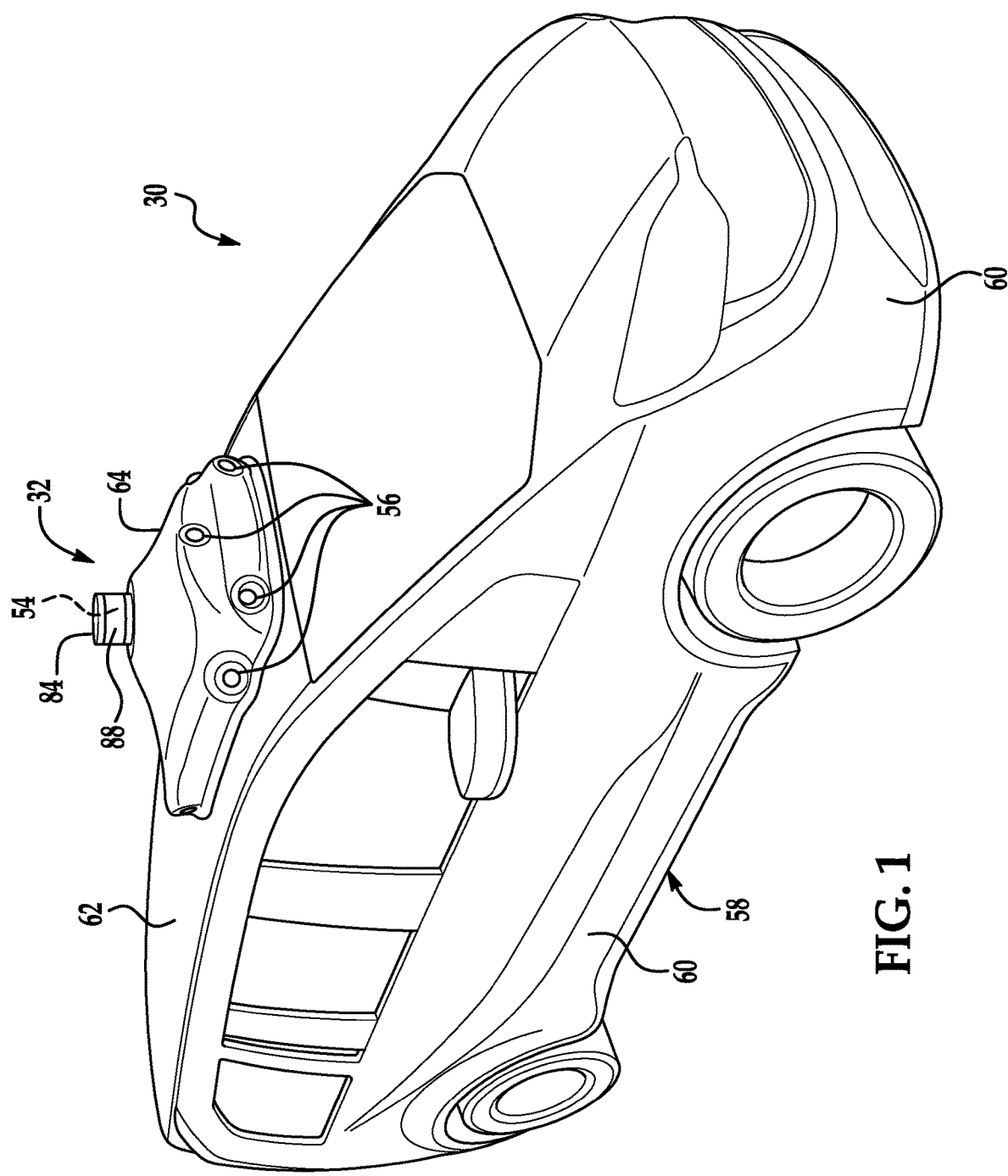
FIG. 1 is a perspective view of an example vehicle.

A sensor-cleaning apparatus includes an upper piece, a lower piece fixed to the upper piece, a plurality of inserts inserted into the upper piece, and a plurality of nozzles. The upper piece and the lower piece form a tubular segment that is elongated along an arc of circle and encloses a chamber. Each nozzle is formed of the upper piece and one of the inserts. Each nozzle includes a deflection surface and a tunnel from the chamber to the deflection surface. Each tunnel is partially formed of the upper piece and partially formed of the respective insert.

The sensor-cleaning apparatus may further include a cylindrical sensor window defining an axis and fixed relative to the tubular segment, and the tubular segment may be elongated circumferentially relative to the axis. Each nozzle may have a direction of discharge in a radially inward and axial direction forming an angle with the axis, and each deflection surface may define the angle with the axis for the respective nozzle.

The nozzles may include at least one first nozzle and at least one second nozzle, the first nozzles may each have a direction of discharge in a radially inward and axial direction forming a first angle with the axis, and the second nozzles may each have a direction of discharge in a radially inward and axial direction forming a second angle with the axis, the second angle being different than the first angle. The plurality of nozzles may include at least two first nozzles and at least two second nozzles, and the first nozzles and second nozzles may be arranged in an alternating pattern along the tubular segment.

The inserts may include one first insert for each first nozzle and one second insert for each second nozzle, the upper piece may include one first slot for each first nozzle and one second slot for each second nozzle, each first slot may be shaped to receive one first insert, and each second slot may be shaped to receive one second insert. Each slot may define an insertion axis along a direction of insertion of the respective insert into the slot, each insert may be nonsymmetrical across any plane containing the respective insertion axis, each first insert may be shaped to block insertion into the second slots, and each second insert may be shaped to block insertion into the first slots.

The sensor-cleaning apparatus may further include a housing to which the cylindrical sensor window and the tubular segment are mounted. The housing may include a housing upper part, the housing upper part may include a horizontal panel extending above the upper piece and a vertical panel extending upward from the horizontal panel, and the vertical panel may be positioned radially inwardly from the tubular segment relative to the tubular segment and may extend circumferentially around the axis. The horizontal panel may include a plurality of openings, each opening may be positioned above one of the nozzles, and the nozzles may be aimed at the cylindrical sensor window above the vertical panel.

The sensor-cleaning apparatus may further include a sensor housing including the cylindrical sensor window, and the vertical panel and the sensor housing may form an air nozzle positioned to emit an air curtain across the cylindrical sensor window.

The upper piece may include the deflection surfaces.

Each insert may include the respective deflection surface.

The lower piece may include a plurality of pegs extending into the chamber, and each peg may support one of the inserts.

The upper piece may include a plurality of slots, and each insert may be inserted into one of the slots. Each slot may include a slot surface, each insert may include an insert surface contacting the respective slot surface, each insert surface may include a channel, and each tunnel may be formed of the respective channel and the respective slot surface.

The lower piece may include an inlet fluidly connected to the chamber. The chamber may be sealed except for the inlet and the nozzles.

The deflection surfaces may be flat.

Each tunnel may have a constant cross-section elongated from the chamber to the respective deflection surface.

With reference to the Figures, a sensor-cleaning apparatus 32 for a vehicle 30 includes at least one upper piece 34, one lower piece 36 fixed to each upper piece 34, a plurality of inserts 38, 40 inserted into each upper piece 34, and a plurality of nozzles 42, 44. Each respective upper piece 34 and lower piece 36 form a tubular segment 46 that is elongated along an arc of circle and encloses a chamber 48. Each nozzle 42, 44 is formed of one upper piece 34 and one of the inserts 38, 40 inserted into that upper piece 34. Each nozzle 42, 44 includes a deflection surface 50 and a tunnel 52 from the chamber 48 to the deflection surface 50, and each tunnel 52 is partially formed of the upper piece 34 and partially formed of the respective insert 38, 40.

The sensor-cleaning apparatus 32 has a robust design without moving parts for distributing fluid from the nozzles 42, 44; i.e., the tubular segments 46, including the nozzles 42, 44, have no moving parts. The upper piece 34, the lower piece 36, and the inserts 38, 40 are easy to manufacture, e.g., by injection molding, and easy to assemble together, and the design of the upper piece 34 and inserts 38, 40 permits the sensor-cleaning apparatus 32 to achieve tight tolerances for the quantity and direction of fluid sprayed from the nozzles 42, 44. The sensor-cleaning apparatus 32 uses fluid for cleaning in an efficient manner.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A vehicle computer can be programmed to operate the vehicle 30 independently of the intervention of a human driver, completely or to a lesser degree. The vehicle computer may be programmed to operate a propulsion, brake system, steering, and/or other vehicle systems based at least in part on data received from a sensor 54 described below, as well as other sensors 56. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 30 includes a body 58. The vehicle 30 may be of a unibody construction, in which a frame and the body 58 of the vehicle 30 are a single component. The vehicle 30 may, alternatively, be of a body-on-frame construction, in which the frame supports the body 58 that is a separate component from the frame. The frame and body 58 may be formed of any suitable materials, for example, steel, aluminum, etc.

The body 58 includes body panels 60 partially defining an exterior of the vehicle 30. The body panels 60 may present a class-A surface, e.g., a finished surface exposed to view by a customer and free of unaesthetic blemishes and defects. The body panels 60 include, e.g., a roof 62, etc.

A housing 64 for the sensor 54 and the other sensors 56 is attachable to the vehicle 30, e.g., to one of the body panels 60 of the vehicle 30, e.g., the roof 62. For example, the housing 64 may be shaped to be attachable to the roof 62, e.g., may have a shape matching a contour of the roof 62. The housing 64 may be attached to the roof 62, which can provide the sensor 54 and the other sensors 56 with an unobstructed field of view of an area around the vehicle 30. The housing 64 may be formed of, e.g., plastic or metal.

Figure 2:
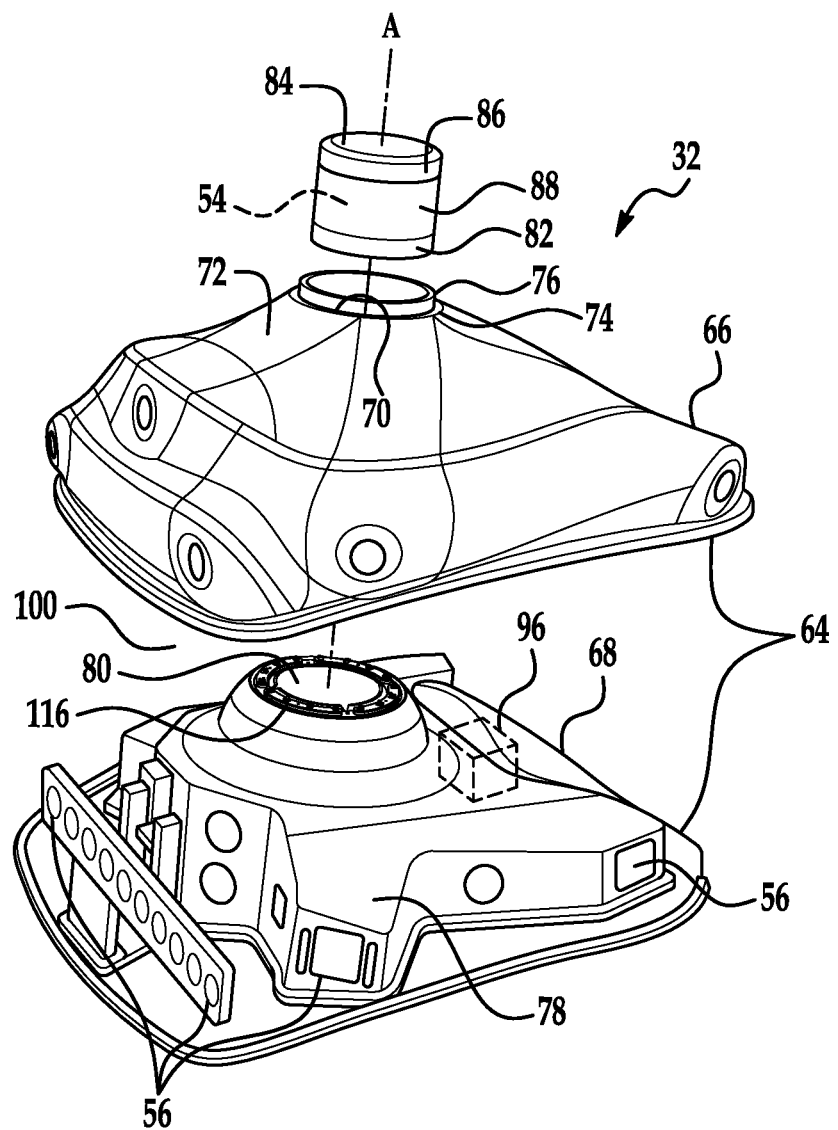
FIG. 2 is an exploded perspective view of a sensor apparatus of the vehicle.

With reference to FIG. 2, the housing 64 includes a housing upper part 66 and a housing lower part 68. The housing upper part 66 and the housing lower part 68 are shaped to fit together, with the housing upper part 66 fitting on top of the housing lower part 68. The housing upper part 66 covers the housing lower part 68. The housing upper part 66 includes a central opening 70 that exposes the housing lower part 68. The central opening 70 is round, e.g., has a circular or slightly elliptical shape. The housing upper part 66 and the housing lower part 68 are each a single piece, i.e., are a continuous piece of material with no internal seams separating multiple pieces. For example, the housing upper part 66 and the housing lower part 68 may each be stamped or molded as a single piece. The housing upper part 66 includes a main body 72, a horizontal panel 74 extending above the upper piece 34 (as seen comparing FIGS. 3 and 5), and a vertical panel 76 extending upward from the horizontal panel 74 (described below), so the main body 72, the horizontal panel 74, and the vertical panel 76 are together a single piece. The horizontal panel 74 and vertical panel 76 circumscribe the central opening 70. The housing lower part 68 includes a main body 78 and a bracket 80, so the main body 78 and the bracket 80 are together a single piece.

The housing lower part 68 includes the bracket 80 to which a sensor-housing bottom 82 of a sensor housing 84 is mounted. The sensor housing 84 is supported by and mounted to the housing 64, specifically the housing lower part 68. The sensor housing 84 can be disposed on top of the housing 64 at a highest point of the housing 64. The bracket 80 is shaped to accept and fix in place the sensor-housing bottom 82 of the sensor housing 84, e.g., with fasteners such as screws, a press fit, or a snap fit. The bracket 80 defines an orientation and position of the sensor housing 84 relative to the vehicle 30. The tubular segments 46 (shown in FIG. 5) collectively form a ring 116 that is supported by and mounted to the housing 64, specifically the housing lower part 68.

Figure 3:
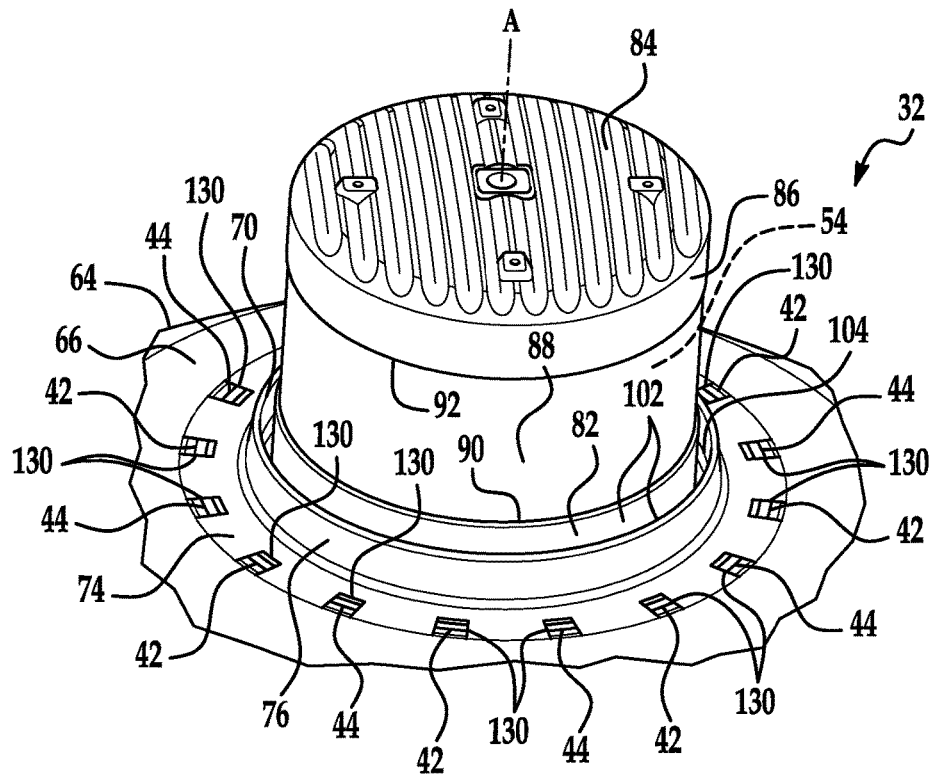
FIG. 3 is a perspective view of a portion of the sensor apparatus.

With reference to FIG. 3, the sensor housing 84 has a cylindrical shape and defines an axis A. The sensor housing 84 extends vertically upward along the axis A from the sensor-housing bottom 82. The sensor housing 84 includes a sensor-housing top 86, a sensor window 88, and the sensor-housing bottom 82. The sensor-housing top 86 is disposed directly above the sensor window 88, and the sensor-housing bottom 82 is disposed directly below the sensor window 88. The sensor-housing top 86 and the sensor-housing bottom 82 are vertically spaced apart by a height of the sensor window 88.

The sensor 54 is disposed inside the sensor housing 84 and is attached to and supported by the housing 64. The sensor 54 may be designed to detect features of the outside world; for example, the sensor 54 may be a radar sensor, a scanning laser range finder, a light detection and ranging (LIDAR) device, or an image processing sensor such as a camera. In particular, the sensor 54 may be a LIDAR device, e.g., a scanning LIDAR device. A LIDAR device detects distances to objects by emitting laser pulses at a particular wavelength and measuring the time of flight for the pulse to travel to the object and back.

The sensor window 88 is cylindrical and defines the axis A, which is oriented substantially vertically. The sensor window 88 extends around the axis A. The sensor window 88 can extend fully around the axis A, i.e., 360°, or partially around the axis A. The sensor window 88 extends along the axis A from a bottom edge 90 to a top edge 92. The bottom edge 90 contacts the sensor-housing bottom 82, and the top edge 92 contacts the sensor-housing top 86. The sensor window 88 is positioned above the tubular segments 46, e.g., the bottom edge 90 of the sensor window 88 is above the tubular segments 46. The outer diameter of the sensor window 88 may be the same as the outer diameters of the sensor-housing top 86 and/or the sensor-housing bottom 82; in other words, the sensor window 88 may be flush or substantially flush with the sensor-housing top 86 and/or the sensor-housing bottom 82. "Substantially flush" means a seam between the sensor window 88 and the sensor-housing top 86 or sensor-housing bottom 82 does not cause turbulence in air flowing along the sensor window 88. At least some of the sensor window 88 is transparent with respect to whatever medium the sensor 54 is capable of detecting. For example, if the sensor 54 is a LIDAR device using wavelengths in the visible spectrum, then the sensor window 88 is transparent with respect to visible light (i.e., visible light can pass through the sensor window 88) at the wavelengths generated by the sensor 54.

Figure 4:
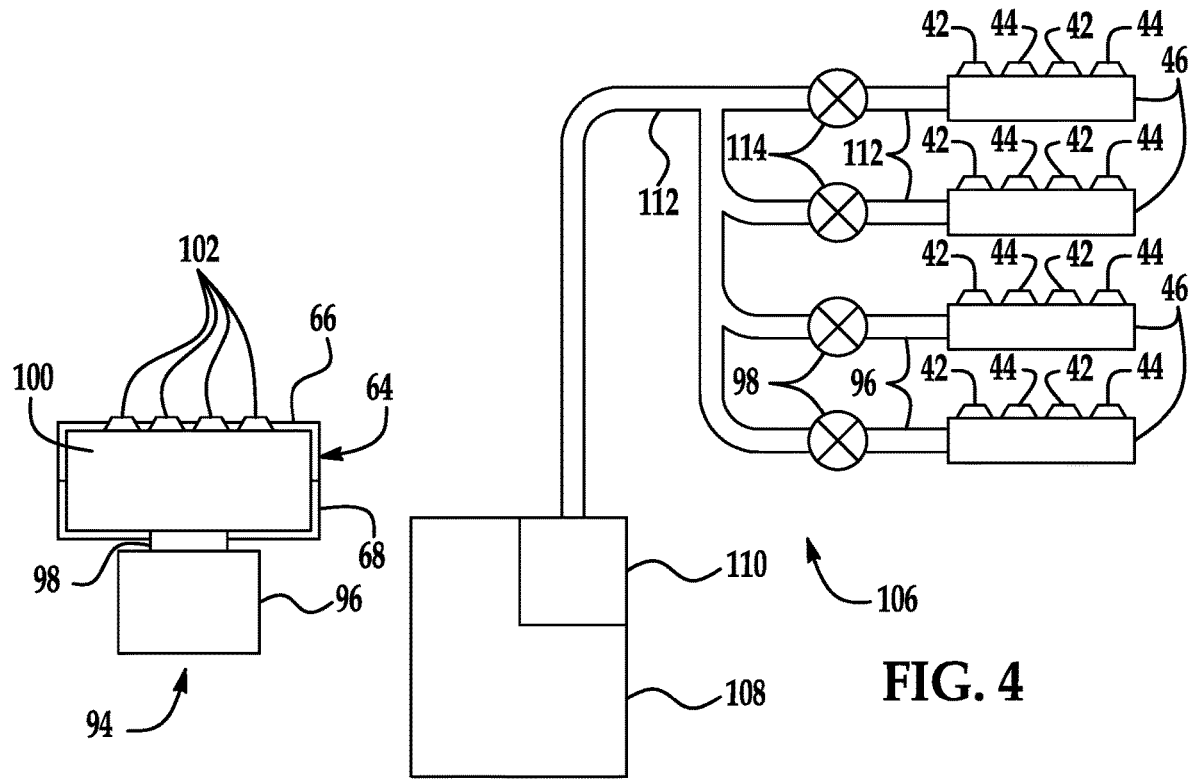
FIG. 4 is a diagram of an example sensor-cleaning system of the vehicle.

With reference to FIG. 4, an air cleaning system 94 includes a pressure source 96, a filter 98, a housing chamber 100, and air nozzles 102. The pressure source 96, the filter 98, and the air nozzles 102 are fluidly connected to each other (i.e., fluid can flow from one to the other) in sequence through the housing chamber 100.

The pressure source 96 increases the pressure of a gas by, e.g., forcing additional gas into a constant volume. The pressure source 96 may be any suitable type of blower, fan, or compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The filter 98 removes solid particulates such as dust, pollen, mold, and bacteria from air flowing through the filter 98. The filter 98 may be any suitable type of filter, e.g., paper, foam, cotton, stainless steel, oil bath, etc.

Returning to FIG. 2, the housing upper part 66 and the housing lower part 68 form the housing chamber 100 by enclosing a space between the housing upper part 66 and the housing lower part 68. The pressure source 96 can be positioned to pressurize the housing chamber 100, i.e., positioned to draw in air from outside the housing and output air into the housing chamber 100.

Returning to FIG. 3, the air nozzles 102 are positioned to receive pressurized air from the housing chamber 100 and discharge that air across the sensor window 88. The air nozzles 102 are oriented to discharge parallel to the axis A across the sensor window 88 from below the sensor window 88. The air nozzles 102 are formed of the sensor housing 84 and the housing upper part 66, specifically of the sensor-housing bottom 82 of the sensor housing 84 and of the vertical panel 76 of the housing upper part 66. The vertical panel 76 and the sensor housing 84 form the air nozzle 102 positioned to emit an air curtain across the sensor window 88. For the purposes of this disclosure, an "air curtain" means a layer of moving air that has a width significantly greater than a thickness, that is close to a surface, and that is moving generally parallel to the surface. The vertical panel 76 is a curved plate of substantially constant thickness extending circumferentially around the axis A at a substantially constant radius from the axis A and extending vertically upward from the horizontal panel 74 parallel to the axis A. The direction of the thickness is orthogonal to the vertical and circumferential directions of extension of the vertical panel 76. The vertical panel 76 is positioned radially inwardly from the tubular segments 46 relative to the axis A. Pressurized air from the housing chamber 100 is directed vertically upward through a gap 104 formed between the sensor-housing bottom 82 and the vertical panel 76.

Returning to FIG. 4, a liquid cleaning system 106 of the vehicle 30 includes a reservoir 108, a pump 110, liquid supply lines 112, valves 114, the tubular segments 46, and the nozzles 42, 44. The nozzles 42, 44 include first nozzles 42 and second nozzles 44. The reservoir 108 and the pump 110 are fluidly connected (i.e., fluid can flow from one to the other) to each valve 114, to each tubular segment 46, and thus to the first nozzles 42 and second nozzles 44. The liquid cleaning system 106 distributes washer fluid stored in the reservoir 108 to the first nozzles 42 and second nozzles 44. "Washer fluid" is any liquid stored in the reservoir 108 for cleaning. The washer fluid may include solvents, detergents, diluents such as water, etc.

The reservoir 108 may be a tank fillable with liquid, e.g., washer fluid for window cleaning. The reservoir 108 may be disposed in a front of the vehicle 30, specifically, in an engine compartment forward of a passenger cabin. Alternatively, the reservoir 108 may be disposed in the housing 64, e.g., in the housing chamber 100 or below the housing lower part 68. The reservoir 108 may store the washer fluid only for supplying the sensor 54 and the other sensors 56, or also for other purposes, such as supply to a windshield.

The pump 110 forces the washer fluid through the liquid supply lines 112 to the valves 114 and then to the first nozzles 42 and second nozzles 44 with sufficient pressure that the washer fluid sprays from the first nozzles 42 and second nozzles 44. The pump 110 is fluidly connected to the reservoir 108. The pump 110 may be attached to or disposed in the reservoir 108.

The liquid supply lines 112 can extend from the pump 110 to the valves 114, and from the valves 114 to the tubular segments 46. A separate liquid supply line 112 extends from each valve 114 to the respective tubular segment 46. The liquid supply lines 112 may be, e.g., flexible tubes.

The valves 114 are actuatable independently of one another to open and close, to permit the washer fluid to flow through or to block the washer fluid; i.e., each valve 114 can be opened or closed without changing the status of the other valves 114. Each valve 114 is positioned to permit or block flow from the reservoir 108 to a respective one of the tubular segments 46. The valves 114 may be any suitable type of valve, e.g., ball valve, butterfly valve, choke valve, gate valve, globe valve, etc.

Returning to FIGS. 2 and 5, the tubular segments 46 forming the ring 116 are fixed relative to the sensor window 88. For example, the tubular segments 46 can be mounted to the housing 64, e.g., bolted to the housing lower part 68, to which the sensor housing 84 including the sensor window 88 is mounted. The tubular segments 46 can be directly attached to each other, e.g., by the lower pieces 36 being integral with each other as shown in FIGS. 5-6, or the tubular segments 46 can be attached to each other indirectly via the housing 64, e.g., the housing lower part 68.

Figure 5:
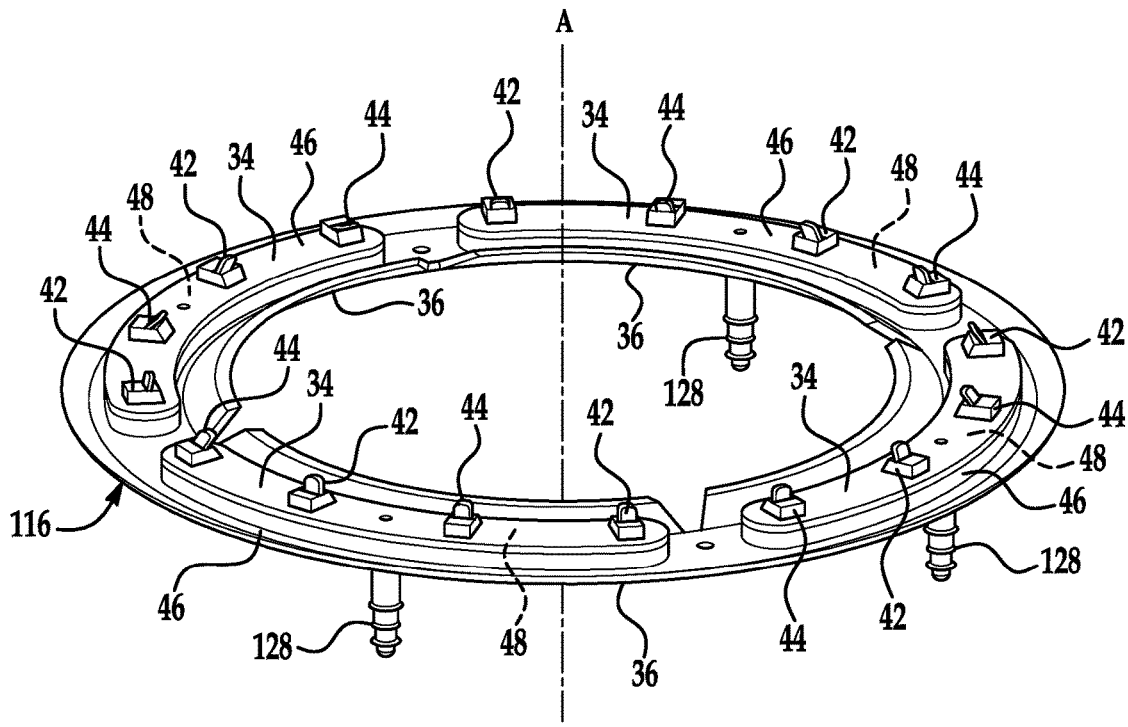
FIG. 5 is a perspective view of a plurality of tubular segments of the sensor-cleaning apparatus.

With reference to FIG. 5, each tubular segment 46 is elongated along an arc of circle centered on the axis A, i.e., circumferentially around the axis A at a substantially constant radius from the axis A. The tubular segments 46 include at least three tubular segments 46; for example, as shown in the Figures, the tubular segments 46 include four tubular segments 46. Each tubular segment 46 can have substantially the same circumferential elongation around the axis A, e.g., 90°. The tubular segments 46 collectively form a ring 116 substantially centered around the axis A. The circumferential elongation of the tubular segments 46 can sum to 360°, e.g., four tubular segments 46 of 90°. Each tubular segment 46 includes the lower piece 36 and the upper piece 34.

Figure 6:
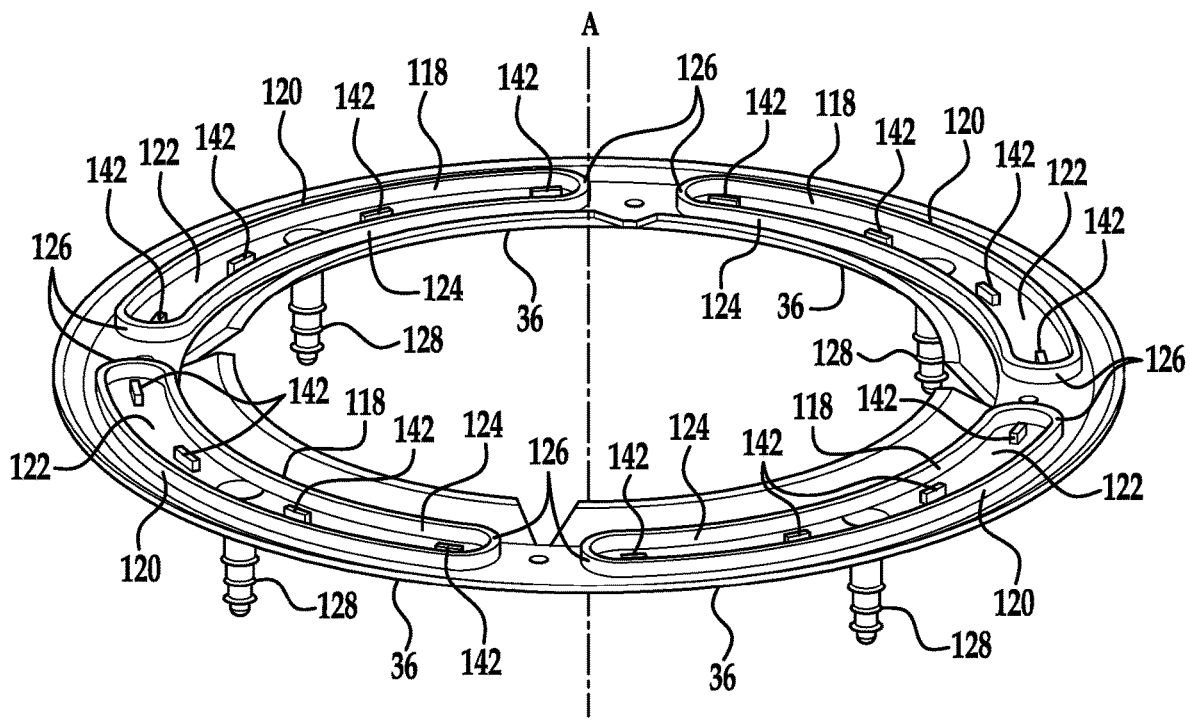
FIG. 6 is a perspective view of a lower piece of the tubular segment.

With reference to FIG. 6, each lower piece 36 defines a channel 118 extending circumferentially around the axis A with the respective tubular segment 46 (shown in FIG. 5). Specifically, each channel 118 has a substantially constant cross-section along the arc of circle extending circumferentially around the axis A. The cross-section of each channel 118 includes a radially outer side wall 120, a floor 122, and a radially inner side wall 124, as shown in FIG. 6. The floor 122 extends horizontally, the radially outer side wall 120 extends vertically from a radially outer edge of the floor 122, and the radially inner side wall 124 extends vertically from a radially inner edge of the floor 122. Each lower piece 36 includes two end walls 126. Each channel 118 extends circumferentially around the axis A from one end wall 126 of the respective lower piece 36 to the other end wall 126 of the respective lower piece 36. The lower pieces 36 together can be a single piece, i.e., a continuous piece of material with no internal seams separating multiple pieces, which can locate the chambers 48 respective to each other within tight tolerances and can make assembly easier by reducing the number of components.

Returning to FIG. 5 along with FIG. 6, each upper piece 34 of the respective tubular segment 46 is fixed to the respective lower piece 36 to form that tubular segment 46. Each upper piece 34 of the respective tubular segment 46 encloses the respective channel 118 of the lower piece 36 of that tubular segment 46 to form the respective chamber 48. Each upper piece 34 extends circumferentially around the axis A with the channel 118 from one end wall 126 to the other end wall 126 of the respective lower piece 36, and each upper piece 34 extends radially outward from the radially inner side wall 124 to the radially outer side wall 120 of the respective lower piece 36.

Each tubular segment 46 includes the chamber 48 enclosed by the upper piece 34 and the channel 118 and end walls 126 of the lower piece 36. Each tubular segment 46 is fluidly isolated from the other tubular segments 46. In other words, the chambers 48 of the tubular segments 46 are fluidly isolated from each other; i.e., the chambers 48 are arranged such that fluid cannot flow from one to the other. The chambers 48 are sealed other than the first nozzles 42, the second nozzles 44, and inlets 128. Having multiple separate chambers 48 can permit isolated cleaning of just a portion of the sensor window 88 (shown in FIG. 3) and can make the pressure requirements for the cleaning more manageable than a single chamber. Separating the fluid flow into the ring 116 into the separate chambers 48 of the tubular segments 46 can help equalize the velocity of fluid leaving the nozzles 42, 44.

Each lower piece 36 includes one inlet 128 fluidly connected to the respective chamber 48. The reservoir 108 is fluidly coupled to each tubular segment 46, i.e., to each chamber 48, via the respective inlet 128. The inlets 128 extend downwardly from the respective lower pieces 36. Each inlet 128 may be disposed approximately halfway along the circumferential elongation of the respective lower piece 36; e.g., if the lower piece 36 has a circumferential elongation of 90°, the inlet 128 is approximately 45° from either end of the lower piece 36.

Figure 7:
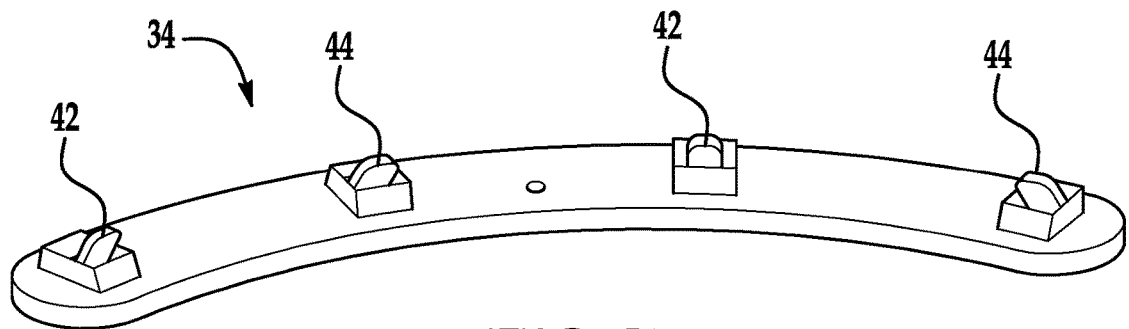
FIG. 7 is a perspective view of an upper piece of the tubular segment.

With reference to FIGS. 5 and 7, each tubular segment 46 includes at least one first nozzle 42 and at least one second nozzle 44 extending through the respective upper piece 34. The first nozzles 42 and the second nozzles 44 are arranged in an alternating pattern around the ring 116 formed of the tubular segments 46; i.e., each first nozzle 42 is circumferentially adjacent to one second nozzle 44 in each direction, and each second nozzle 44 is circumferentially adjacent to one first nozzle 42 in each direction. The first nozzles 42 and second nozzles 44 are substantially evenly spaced around the ring 116; i.e., the distance from each first or second nozzle 42, 44 to the adjacent first or second nozzle 42, 44 is substantially the same. The first nozzles 42 can include eight first nozzles 42, and the second nozzles 44 can include eight second nozzles 44. The first nozzles 42 and the second nozzles 44 can be evenly divided among the tubular segments 46; e.g., with four tubular segments 46, each tubular segment 46 includes two first nozzles 42 and two second nozzles 44. The alternating pattern of first and second nozzles 42, 44 provides even circumferential coverage of both upper and lower sections of the sensor window 88 (as described below, the first nozzles 42 and the second nozzles 44 are aimed at different vertical portions of the sensor window 88).

Returning to FIG. 3, the horizontal panel 74 includes a plurality of openings 130. Each opening 130 is positioned directly above one of the nozzles 42, 44. The horizontal panel 74 covers the tubular segments 46 (shown in FIG. 5) except at the openings 130. As described below, each of the nozzles 42, 44 has a direction of discharge aimed at the sensor window 88. The nozzles 42, 44 are aimed through the respective openings 130 at the sensor window 88 above the vertical panel 76. The nozzles 42, 44 are aimed so that the spray emitted by each nozzle 42, 44 passes through the respective opening 130 and above the vertical panel 76 before contacting the sensor window 88. The housing upper part 66 provides an easily manufacturable shape, e.g., by injection molding or stamping, that is a single piece that performs multiple jobs, i.e., protecting the ring 116 while providing the openings 130, as well as partially forming the air nozzles 102.

With reference to FIGS. 8A-D, the first nozzles 42 and second nozzles 44 are liquid nozzles (i.e. nozzles for dispensing, e.g., spraying, liquid fluid). The first nozzles 42 and second nozzles 44 are shaped to spray fluid in a flat-fan pattern. For the purposes of this disclosure, a "flat-fan pattern" means that the spray has an increasing width in one dimension as the spray moves away from the nozzle 42, 44 and has a generally flat shape along a plane defined by the width and the direction of discharge. The first nozzles 42 and second nozzles 44 each include the deflection surface 50, which is flat, and the tunnel 52 from the chamber 48 directed at the respective deflection surface 50. Fluid exiting one of the chambers 48 through one of the tunnels 52 hits the respective deflection surface 50 and spreads out into the flat-fan pattern defined by the deflection surface 50.

Figure 8A:
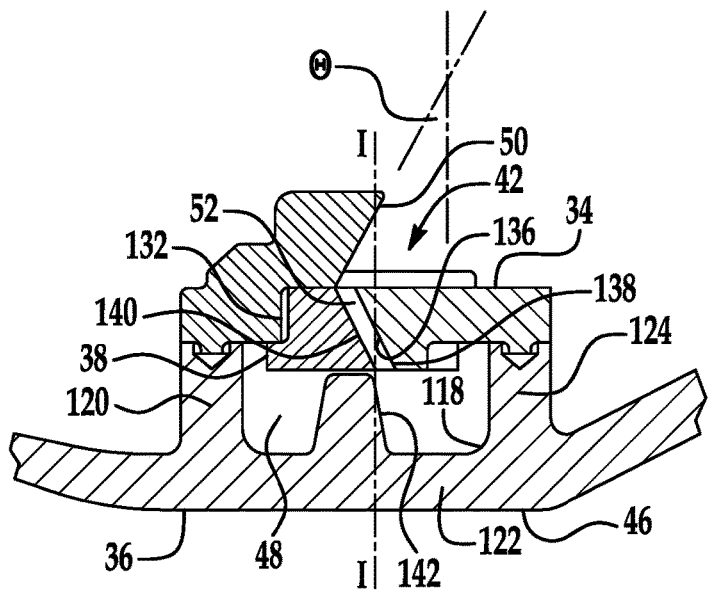
FIG. 8A is a cross-sectional view of a first example of a first nozzle of the sensor apparatus.
Figure 8B:
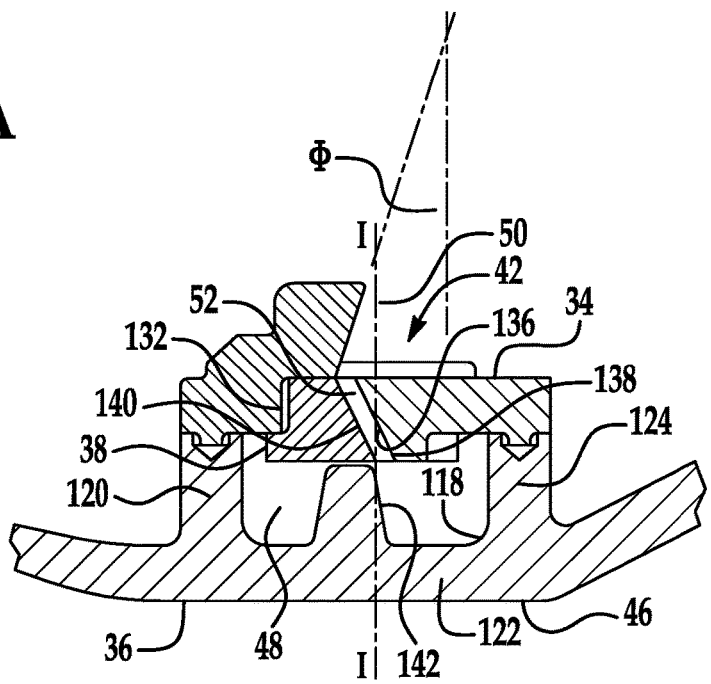
FIG. 8B is a cross-sectional view of a first example of a second nozzle of the sensor apparatus.
Figure 8C:
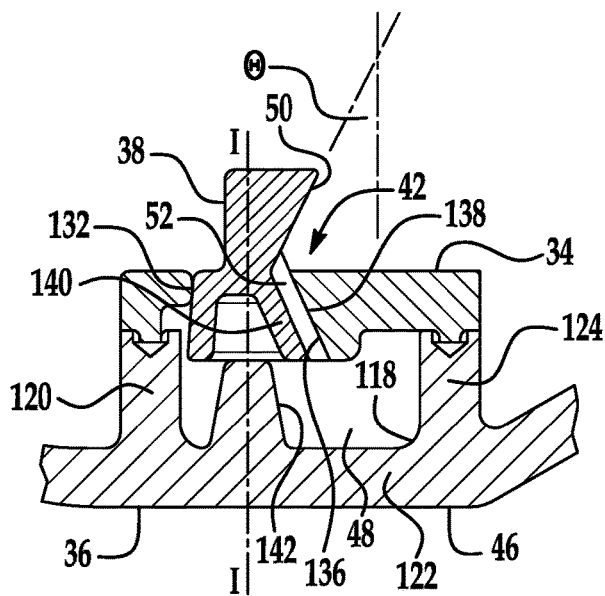
FIG. 8C is a cross-sectional view of a second example of a first nozzle of the sensor apparatus.
Figure 8D:
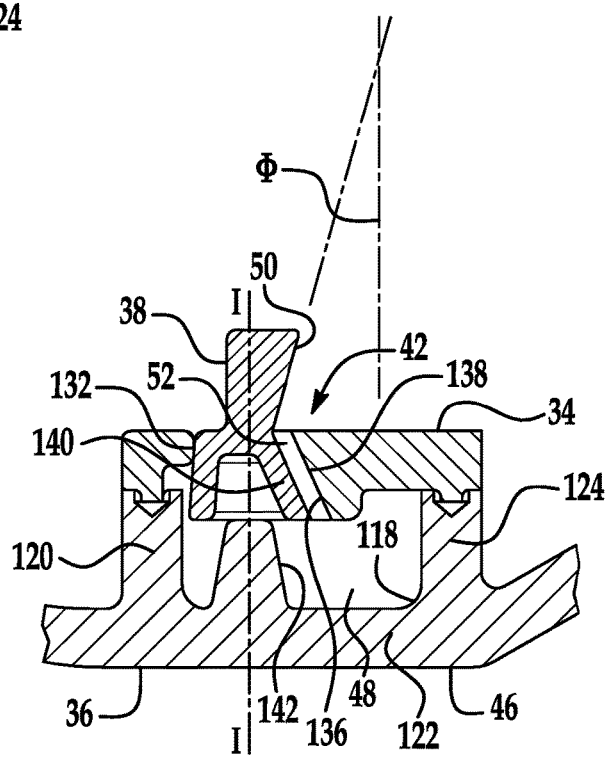
FIG. 8D is a cross-sectional view of a second example of a second nozzle of the sensor apparatus.

The first nozzles 42 each have a direction of discharge in a radially inward and axial direction, i.e., a direction that is toward the axis A and along the axis A, forming the first angle $\theta$ with the axis A, as shown in FIGS. 8A and 8C. The second nozzles 44 each have a direction of discharge in a radially inward and axial direction forming the second angle $\varphi$ with the axis A, as shown in FIGS. 8B and 8D. The second angle $\varphi$ is different than the first angle $\theta$. The deflection surfaces 50 of the first nozzles 42 each define the first angle $\theta$ with the axis A, and the deflection surfaces 50 of the second nozzles 44 each define the second angle $\varphi$ with the axis A. The different first angle $\theta$ and second angle $\varphi$ provide cleaning coverage along a height of the sensor window 88 (shown in FIG. 3). The sensor-cleaning apparatus 32 thus provides good coverage when cleaning the sensor window 88.

Figure 9A:
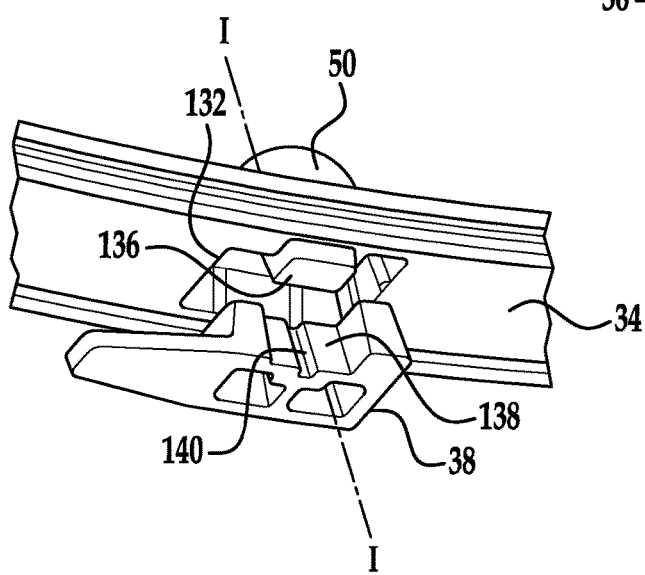
FIG. 9A is a bottom perspective view of a first example of a first insert exploded from the upper piece.
Figure 9B:
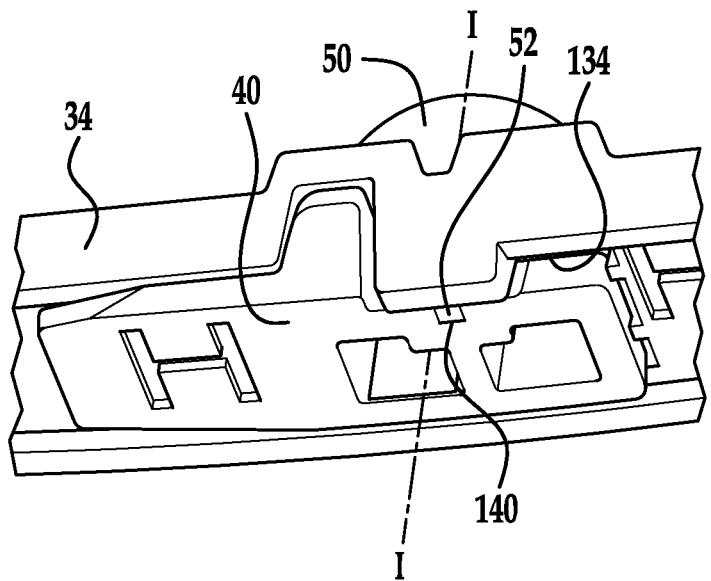
FIG. 9B is a bottom perspective view of a first example of a second insert and the upper piece.
Figure 10A:
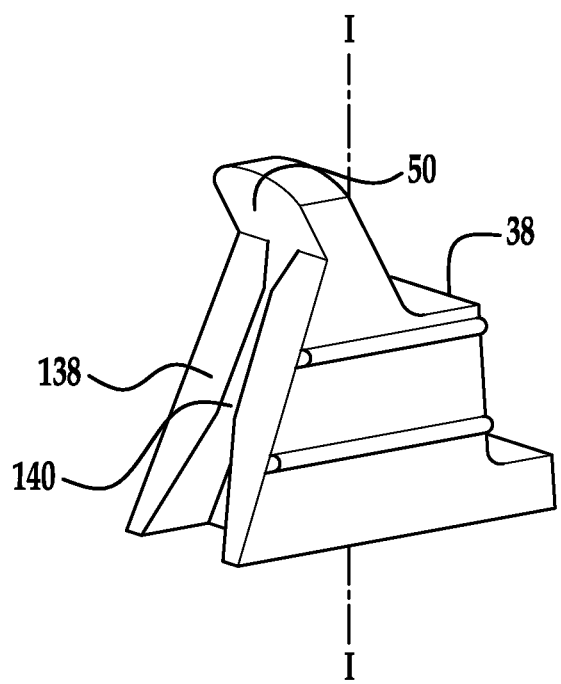
FIG. 10A is a perspective view of a second example of the first insert.
Figure 10B:
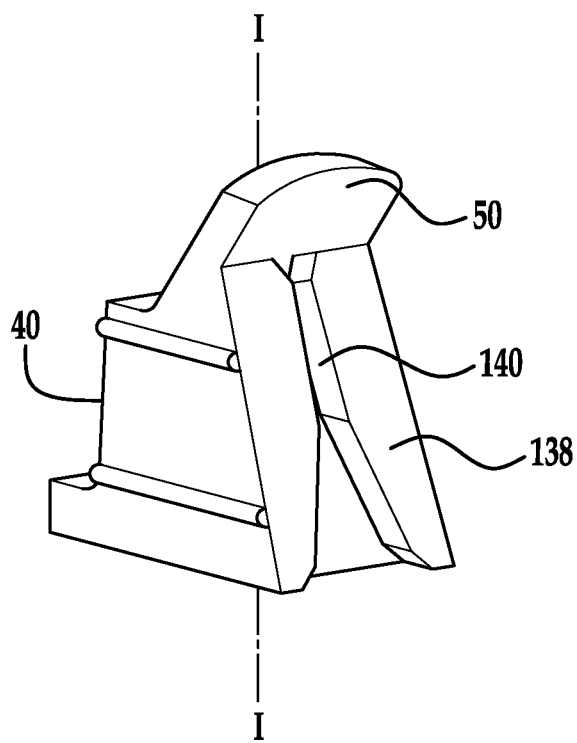
FIG. 10B is a perspective view of a second example of the second insert.

With reference to FIGS. 9A-B, each upper piece 34 includes a plurality of slots 132, 134, specifically one first slot 132 for each first nozzle 42 and one second slot 134 for each second nozzle 44 (shown in FIG. 5). Each first slot 132 is shaped to receive one first insert 38 (described below) inserted into the first slot 132, and each second slot 134 is shaped to receive one second insert 40 inserted into the second slot 134. Each slot 132, 134 defines a direction of insertion for the respective insert 38, 40, and each slot 132, 134 defines an insertion axis I extending along the direction of insertion. The insertion axis I along the direction of insertion is positioned at a geometric center, i.e., at a centroid, of a cross-section of the slot 132, 134 orthogonal to the direction of insertion (i.e., orthogonal to the insertion axis I).

With reference to FIGS. 9A-10B, a plurality of the inserts 38, 40 are inserted into the upper piece 34, specifically one first insert 38 for each first nozzle 42 and one second insert 40 for each second nozzle 44 (shown in FIG. 5). Each first insert 38 is shaped to block insertion into any of the second slots 134, and each second insert 40 is shaped to block insertion into any of the first slots 132. Each first insert 38 includes at least one protrusion that will contact the upper piece 34 and interfere with insertion into one of the second slots 134, regardless of rotation of the first insert 38 about the insertion axis I. Each second insert 40 includes at least one protrusion that will contact the upper piece 34 and interfere with insertion into one of the first slots 132, regardless of rotation of the second insert 40 about the insertion axis I. Each insert 38, 40 is nonsymmetrical about any plane containing the insertion axis I, i.e., about any plane parallel to the direction of insertion. Each first insert 38 thus cannot be inserted into one of the second slots 134, or vice versa, and each insert 38, 40 can only be inserted with the correct orientation for proper operation of the respective nozzle 42, 44.

Each tunnel 52 (shown with the inserts 38, 40 installed in FIGS. 8A-D) is partially formed of the upper piece 34, e.g., the respective slot 132, 134, and partially formed of the respective insert 38, 40. Each slot 132, 134 includes a slot surface 136, and each insert 38, 40 includes an insert surface 138 contacting the respective slot surface 136. For example, the slot surface 136 and the insert surface 138 can both be flat and can contact each other along the flat surfaces. Each insert surface 138 includes a channel 140 extending along the insert surface 138 and extending into the insert 38, 40. Each tunnel 52 is formed of the respective channel 140 and the respective slot surface 136. Each insert 38, 40 mates with the respective slot 132, 134 so as to block fluid flow between that insert 38, 40 and that slot 132, 134 except through the respective tunnel 52. Each tunnel 52 has a constant cross-section elongated from the chamber 48 to the respective deflection surface 50 (shown in FIGS. 8A-D).

Returning to FIG. 6, each lower piece 36 includes a plurality of pegs 142 extending into the respective chamber 48. Each peg 142 is positioned directly below one of the inserts 38, 40, and each peg 142 supports one of the inserts 38, 40, i.e., prevents that insert 38, 40 from moving out of the respective slot 132, 134, as shown in FIGS. 8A-D. Each insert 38, 40 can have one peg 142 supporting that insert 38, 40. The pegs 142 extend vertically upward from the floor 122 of the lower piece 36. The pegs 142 permit flow through the respective chamber 48 (shown in FIG. 5) around the pegs 142. The pegs 142 can be integral with the respective lower piece 36, i.e., a continuous piece of material with no internal seams separating multiple pieces, which simplifies assembly.

Returning to FIGS. 8A-D, each nozzle 42, 44 is formed of the upper piece 34 and one of the inserts 38, 40. Each first nozzle 42 is formed of the upper piece 34 and one of the first inserts 38, and each second nozzle 44 is formed of the upper piece 34 and one of the second inserts 40. The tunnel 52 of each nozzle 42, 44 is formed of the upper piece 34 and the respective insert 38, 40, as described above. The deflection surface 50 of each nozzle 42, 44 can be formed of the upper piece 34; in other words, the upper piece 34 includes the deflection surfaces 50, as shown in FIGS. 8A-B and 9A-B. Alternatively, the deflection surface 50 of each nozzle 42, 44 can be formed of the respective insert 38, 40; in other words, each insert 38, 40 includes the respective deflection surface 50, as shown in FIGS. 8C-D and 10A-B.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A sensor-cleaning apparatus comprising:
   an upper piece;
   a lower piece fixed to the upper piece, wherein the upper piece and the lower piece form a tubular segment that is elongated along an arc of a circle and encloses a chamber;
   a plurality of inserts inserted into the upper piece; and
   a plurality of nozzles;
   wherein each nozzle is formed of the upper piece and one of the plurality of the inserts;
   each nozzle includes a deflection surface and a tunnel from the chamber to the deflection surface;
   each tunnel is partially formed of the upper piece and partially formed of the respective insert;
   the upper piece includes a plurality of slots;
   each insert is inserted into one of the slots;
   the lower piece includes a plurality of pegs extending into the chamber;
   each peg supports one of the plurality of the inserts; and
   each peg is positioned outside of the plurality of the slots.

2. The sensor-cleaning apparatus of claim 1, further comprising a cylindrical sensor window defining an axis and fixed relative to the tubular segment, wherein the tubular segment is elongated circumferentially relative to the axis.

3. The sensor-cleaning apparatus of claim 2, wherein each nozzle has a direction of discharge in a radially inward and axial direction forming an angle with the axis, wherein each deflection surface defines the angle with the axis for the respective nozzle.

4. The sensor-cleaning apparatus of claim 2, wherein
   the plurality of the nozzles includes at least one first nozzle and at least one second nozzle;
   each at least one first nozzle has a direction of discharge in a radially inward and axial direction forming a first angle with the axis; and
   each at least one second nozzle has a direction of discharge in a radially inward and axial direction forming a second angle with the axis, the second angle being different than the first angle.

5. The sensor-cleaning apparatus of claim 4, wherein the plurality of nozzles includes at least two first nozzles and at least two second nozzles, and the first nozzles and second nozzles are arranged in an alternating pattern along the tubular segment.

6. The sensor-cleaning apparatus of claim 4, wherein the plurality of the inserts includes one first insert for each first nozzle and one second insert for each second nozzle, the plurality of the slots includes one first slot for each first nozzle and one second slot for each second nozzle, each first slot is shaped to receive one first insert, and each second slot is shaped to receive one second insert.

7. The sensor-cleaning apparatus of claim 6, wherein each slot defines an insertion axis along a direction of insertion of the respective insert into the slot, each insert is nonsymmetrical across any plane containing the respective insertion axis, each first insert is shaped to block insertion into the second slots, and each second insert is shaped to block insertion into the first slots.

8. The sensor-cleaning apparatus of claim 2, further comprising a housing to which the cylindrical sensor window and the tubular segment are mounted.

9. The sensor-cleaning apparatus of claim 8, wherein the housing includes a housing upper part, the housing upper part includes a horizontal panel extending above the upper piece and a vertical panel extending upward from the horizontal panel, and the vertical panel is positioned radially inwardly from the tubular segment relative to the tubular segment and extends circumferentially around the axis.

10. The sensor-cleaning apparatus of claim 9, wherein the horizontal panel includes a plurality of openings, each opening is positioned above one of the plurality of the nozzles, and the plurality of the nozzles are aimed at the cylindrical sensor window above the vertical panel.

11. The sensor-cleaning apparatus of claim 9, further comprising a sensor housing including the cylindrical sensor window, and the vertical panel and the sensor housing form an air nozzle positioned to emit an air curtain across the cylindrical sensor window.

12. The sensor-cleaning apparatus of claim 1, wherein the upper piece includes the deflection surfaces.

13. The sensor-cleaning apparatus of claim 1, wherein each insert includes the respective deflection surface.

14. The sensor-cleaning apparatus of claim 1, wherein each slot includes a slot surface, each insert includes an insert surface contacting the respective slot surface, each insert surface includes a channel, and each tunnel is formed of the respective channel and the respective slot surface.

15. The sensor-cleaning apparatus of claim 1, wherein the lower piece includes an inlet fluidly connected to the chamber.

16. The sensor-cleaning apparatus of claim 15, wherein the chamber is sealed except for the inlet and the plurality of the nozzles.

17. The sensor-cleaning apparatus of claim 1, wherein the deflection surfaces are flat.

18. The sensor-cleaning apparatus of claim 1, wherein each tunnel has a constant cross-section elongated from the chamber to the respective deflection surface.

19. The sensor-cleaning apparatus of claim 14, wherein the tunnel is straight from the chamber to the respective deflection surface.

* * * * *